US009708794B2

United States Patent
Rauma et al.

(10) Patent No.: US 9,708,794 B2
(45) Date of Patent: Jul. 18, 2017

(54) ELECTROMECHANICAL DRIVE FOR A WORKING MACHINE

(71) Applicant: Visedo Oy, Lappeenranta (FI)

(72) Inventors: Kimmo Rauma, Lappeenranta (FI); Ville Naumanen, Lappeenranta (FI)

(73) Assignee: VISEDO OY, Lappeenranta (FI)

(*) Notice: Subject to any disclaimer, the term of this patent is extended or adjusted under 35 U.S.C. 154(b) by 99 days.

(21) Appl. No.: 14/615,481

(22) Filed: Feb. 6, 2015

(65) Prior Publication Data

US 2016/0244948 A1 Aug. 25, 2016

(30) Foreign Application Priority Data

Feb. 7, 2014 (EP) .................................... 14154250

(51) Int. Cl.
*B60K 6/26* (2007.10)
*B60K 6/54* (2007.10)
(Continued)

(52) U.S. Cl.
CPC .............. *E02F 9/2075* (2013.01); *B60K 6/26* (2013.01); *B60K 6/46* (2013.01); *B60K 6/54* (2013.01);
(Continued)

(58) Field of Classification Search
CPC .. B60K 2006/4825; B60K 6/547; B60K 6/46; B60K 17/043; B60K 6/54; B60K 6/26; B60W 10/02; B60W 10/06; B60W 10/08; B60W 20/10; B60W 20/13; B60W 2510/0638; B60W 2510/085; B60W 2510/1005; B60W 2510/244;
(Continued)

(56) References Cited

U.S. PATENT DOCUMENTS

| 5,879,265 | A | 3/1999 | Bek | |
|---|---|---|---|---|
| 2007/0254771 | A1* | 11/2007 | Funke | B60W 10/06 477/68 |
| 2011/0184599 | A1* | 7/2011 | Cimatti | B60K 6/48 701/22 |

FOREIGN PATENT DOCUMENTS

| DE | 19619321 A1 | 11/1997 |
|---|---|---|
| DE | 10347596 B3 | 6/2005 |

(Continued)

OTHER PUBLICATIONS

International Search Report, dated Jul. 10, 2014, from corresponding PCT application.

*Primary Examiner* — Nga X Nguyen
(74) *Attorney, Agent, or Firm* — Young & Thompson

(57) ABSTRACT

An electromechanical drive comprises an electrical machine (101a), an electrical power converter (103) for converting voltage of an external electrical system to voltage suitable for the electrical machine, and a gearbox (111a) for mechanically connecting the electrical machine to an actuator (112a) and capable of providing selectable transmission ratios between the electrical machine and the actuator. The electrical power converter comprises a controller for selecting one of the selectable transmission ratios at least partly on the basis of a) first data related to actual and/or desired torque-speed operating point of the actuator and b) second data related to functional properties of at least the electrical machine. Thus, the transmission ratio can be selected at least partly from the viewpoint of the electrical machine taking into account for example the most advantageous speed range and/or torque range of the electrical machine.

13 Claims, 3 Drawing Sheets

(51) Int. Cl.
- *B60W 10/08* (2006.01)
- *B60W 10/10* (2012.01)
- *E02F 9/20* (2006.01)
- *B60K 6/46* (2007.10)
- *B60K 7/00* (2006.01)
- *B60K 17/04* (2006.01)
- *B60W 20/30* (2016.01)
- *E02F 3/34* (2006.01)

(52) U.S. Cl.
CPC .......... *B60K 7/0007* (2013.01); *B60K 17/043* (2013.01); *B60W 10/08* (2013.01); *B60W 10/10* (2013.01); *B60W 20/30* (2013.01); *E02F 9/202* (2013.01); *E02F 9/2079* (2013.01); *B60K 2007/0061* (2013.01); *B60W 2300/17* (2013.01); *B60W 2710/086* (2013.01); *B60W 2710/1005* (2013.01); *B60W 2710/105* (2013.01); *B60Y 2200/92* (2013.01); *B60Y 2400/61* (2013.01); *E02F 3/34* (2013.01); *Y02T 10/56* (2013.01); *Y02T 10/6217* (2013.01); *Y10S 903/906* (2013.01); *Y10S 903/917* (2013.01); *Y10S 903/93* (2013.01)

(58) Field of Classification Search
CPC . B60W 2710/0644; B60W 2710/0666; B60W 2710/1005; B60W 10/10; B60W 20/30; E02F 9/2075; E02F 9/202
USPC .................................. 701/22, 36; 477/55, 68
See application file for complete search history.

(56) References Cited

FOREIGN PATENT DOCUMENTS

| EP | 1466772 A | 10/2004 |
|---|---|---|
| EP | 2453549 A1 | 5/2012 |

* cited by examiner

ELECTROMECHANICAL DRIVE FOR A WORKING MACHINE

FIELD OF THE INVENTION

The invention relates to an electromechanical drive that can be, for example but not necessarily, a part of an electromechanical power transmission chain of a working machine. Furthermore, the invention relates to a method and to a computer program for controlling an electromechanical drive.

BACKGROUND

In many cases, an electromechanical drive for driving an actuator, e.g. a wheel or a chain track, comprises an electrical power converter, an electrical machine, and a gearbox between the electrical machine and the actuator. The electromechanical drive can be for example a part of an electromechanical power transmission chain which comprises a generator for supplying electrical power to the electrical power converter. The generator can be driven with a combustion engine that can be e.g. a diesel engine, an Otto-cycle engine, or a turbine engine. The electromechanical power transmission chain can be, in turn, a part of for example a working machine that can be a mobile working machine having wheels and/or chain tracks. A mobile working machine can be, for example, a tractor, a bucket charger, a road drag, an excavator, or a bulldozer. It is also possible that the working machine is for example a stone crusher or a wood chipping machine that is not necessarily provided with means for moving the working machine. The electromechanical power transmission chain provides advantages compared to a traditional mechanical power transmission chain because for example the rotational speed of the combustion engine can be more freely selected from the viewpoint of the operational efficiency of the combustion engine, and thus savings in the fuel costs can be achieved.

Typically, the transmission ratio provided by the gearbox of the electromechanical drive is selected manually or by a high level control system. Thereafter, a torque or speed reference of the electrical machine is supplied to the electrical power converter, wherein the torque or speed reference of the electrical machine depends on the prevailing transmission ratio provided by the gear box and on the desired operation of the actuator, e.g. a wheel or a chain track.

The approach of the kind described above is, however, not free from challenges. One the challenges is related to cases where the prevailing transmission ratio provided by the gearbox happens to be such that the operation point of the electrical motor becomes non-optimal from the viewpoint of losses and/or some other factors.

SUMMARY

The following presents a simplified summary in order to provide a basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

In accordance with the invention, there is provided a new electromechanical drive for driving an actuator that can be, for example but not necessarily, a wheel or a chain track. An electromechanical drive according to the invention comprises:

- an electrical machine,
- a gearbox having a first shaft connected to the electrical machine and a second shaft for driving an actuator, the gearbox being capable of providing selectable transmission ratios each being a ratio of a rotational speed of the first shaft to a rotational speed of the second shaft,
- an electrical power converter for converting voltage of an external electrical system to voltage suitable for the electrical machine.

The electrical power converter comprises:

- a controller for selecting one of the selectable transmission ratios on the basis of a) first data related to an actual and/or desired torque-speed operating point of the second shaft when driving the actuator and b) second data related to functional proper-ties of at least the electrical machine, and
- a signal output for delivering, to the gearbox, a control signal so as to set the gearbox to operate at the selected one of the selectable transmission ratios.

As the functional properties of at least the electrical machine can be taken into account in the selection of above-mentioned transmission ratio, the transmission ratio can be automatically selected for example so that the electrical machine operates on an advantageous speed range and/or torque range. Furthermore, the controller can be adapted to select the transmission ratio so that the sum of losses of the electrical machine, the gearbox, and the electrical power converter is minimized instead of minimizing only the losses of the electrical machine.

In accordance with the invention, there is provided also a new working machine that can be, for example but not necessarily, a tractor, a bucket charger, a road drag, an excavator, a bulldozer, a stone crusher, or a wood chipping machine. The working machine according to the invention comprises:

- a combustion engine, and
- an electromechanical power transmission chain between the combustion engine and one or more actuators, e.g. wheels and/or chain tracks, of the mobile working machine.

The above-mentioned electromechanical transmission chain comprises at least one electromechanical drive according to the present invention.

The working machine may comprise a hydraulic system for driving some actuators of the working machine, e.g. a bucket of a bucket charger. In this case, the working machine comprises preferably a liquid cooling system arranged to cool both the hydraulic system and the electromechanical power transmission chain.

In accordance with the invention, there is provided also a new method for controlling an electromechanical drive that comprises an electrical machine, an electrical power converter for converting voltage of an external electrical system to voltage suitable for the electrical machine, and a gearbox having a first shaft connected to the electrical machine and a second shaft for driving an actuator, the gearbox being capable of providing selectable transmission ratios each being a ratio of a rotational speed of the first shaft to a rotational speed of the second shaft. A method according to the invention comprises:

- selecting, by the electrical power converter, one of the selectable transmission ratios on the basis of a) first data related to an actual and/or desired torque-speed operating point of the second shaft when driving the actuator and b) second data related to functional properties of at least the electrical machine, and delivering, from the electrical power converter to the gearbox, a control signal so as to set the gearbox to operate at the selected one of the selectable transmission ratios.

In accordance with the invention, there is provided also a new computer program for controlling an electromechanical drive that comprises an electrical machine, an electrical power converter for converting voltage of an external electrical system to voltage suitable for the electrical machine, and a gearbox having a first shaft connected to the electrical machine and a second shaft for driving an actuator, the gearbox being capable of providing selectable transmission ratios each being a ratio of a rotational speed of the first shaft to a rotational speed of the second shaft. A computer program according to the invention comprises computer executable instructions for controlling a programmable processing system of the electrical power converter to:

select one of the selectable transmission ratios on the basis of a) first data related to an actual and/or desired torque-speed operating point of the second shaft when driving the actuator and b) second data related to functional properties of at least the electrical machine, and transmit, from the electrical power converter to the gearbox, a control signal so as to set the gearbox to operate at the selected one of the selectable transmission ratios.

In accordance with the invention, there is provided also a new computer program product. The computer program product comprises a non-volatile computer readable medium, e.g. a compact disc "CD", encoded with a computer program according to the invention.

A number of exemplifying and non-limiting embodiments of the invention are described in accompanied dependent claims.

Various exemplifying and non-limiting embodiments of the invention both as to constructions and to methods of operation, together with additional objects and advantages thereof, will be best understood from the following description of specific exemplifying and non-limiting embodiments when read in connection with the accompanying drawings.

The verbs "to comprise" and "to include" are used in this document as open limitations that neither exclude nor require the existence of unrecited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF THE FIGURES

Exemplifying and non-limiting embodiments of the invention and their advantages are explained in greater detail below in the sense of examples and with reference to the accompanying drawings, in which.

DESCRIPTION OF THE EXEMPLIFYING AND NON-LIMITING EMBODIMENTS

Figure 1:
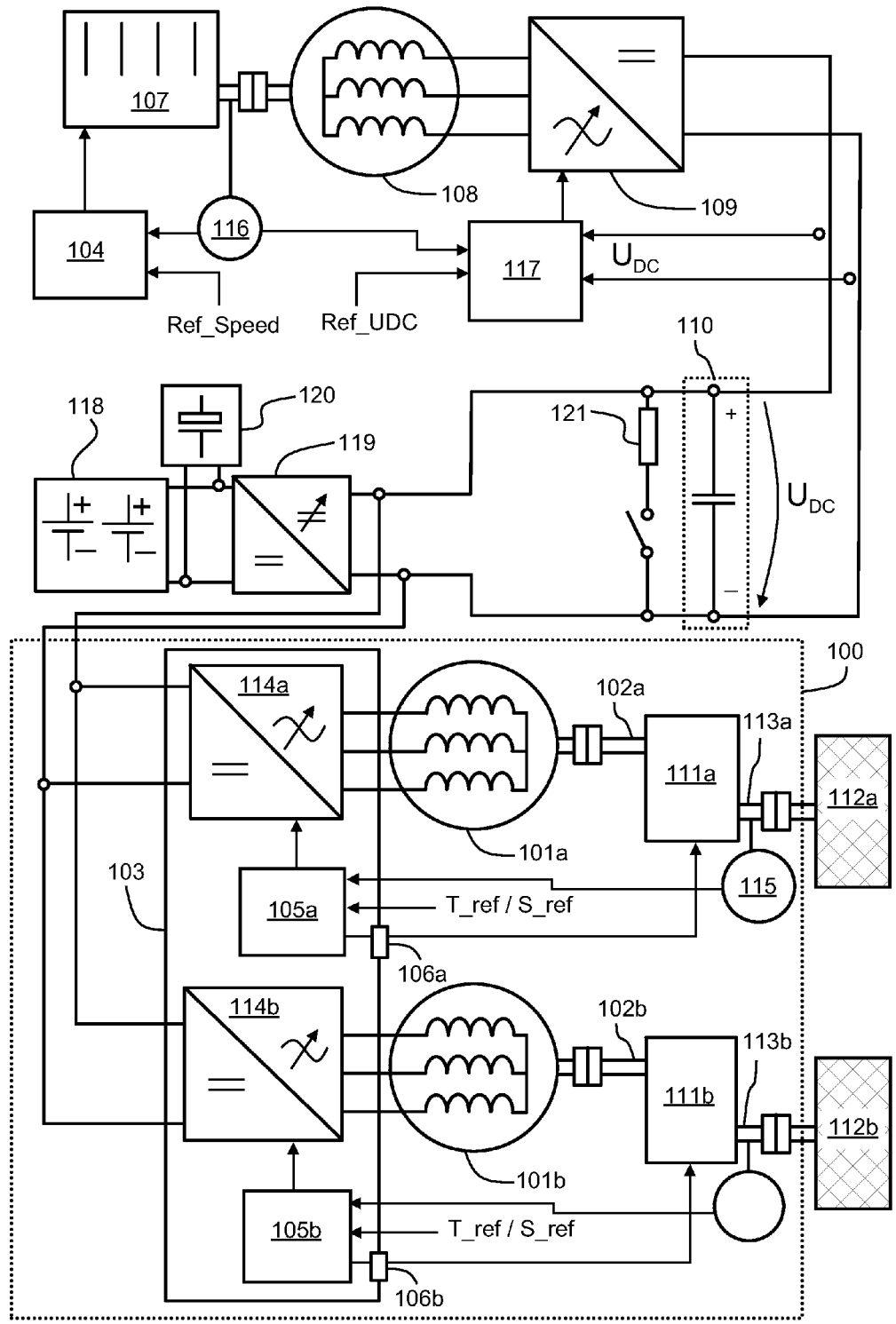
FIG. 1 shows a schematic illustration of an electromechanical power transmission chain that comprises an electromechanical drive according to an exemplifying and non-limiting embodiment of the invention.

FIG. 1 shows a schematic illustration of an electromechanical power transmission chain that comprises an electromechanical drive 100 according to an exemplifying and non-limiting embodiment of the invention. The electromechanical power transmission chain comprises a combustion engine 107 that can be e.g. a diesel engine, an Otto-cycle engine, or a turbine engine. The electromechanical power transmission chain comprises a generator 108 that is driven with the combustion engine 107 and an electronic power converter 109 connected to the windings of the generator 108. The electronic power converter 109 is arranged to convert the voltage of the generator 108 into a form suitable for the electromechanical drive 100. In the exemplifying case shown in FIG. 1, it is assumed that the combustion engine 107 is operated in a speed controlled mode according to a target value Ref_Speed of the rotational speed of the combustion engine. A controller 104 is adapted to control the operation of the combustion engine 107 on the basis of the target value Ref_Speed and an output signal of a rotational speed indicator 116. In order to improve the accuracy of the control of the stator voltages of the generator 108, the output signal of the rotational speed indicator 116 can be utilized also by a controller 117 in the control of the electronic power converter 109. The target value Ref_Speed can be arranged to be dependent, according to a pre-determined rule, on the output power needed to be generated by the combustion engine for example so that the efficiently of the combustion engine 107 is optimized at each output power of the combustion engine.

The electromechanical drive 100 comprises an electrical machine 101a and a gearbox 111a for delivering mechanical power between the electrical machine 101a and an actuator 112a. The actuator 112a can be, for example but not necessarily, a wheel, a chain track, a hydraulic pump, a cutter of a wood chipping machine, or some other actuator. The electromechanical drive 100 comprises also another electrical machine 101b and another gearbox 111b for delivering mechanical power between the electrical machine 101b and another actuator 112b. It is worth noting that the number of actuators driven by an electromechanical drive according to an exemplifying embodiment of the invention can be as well only one or more than two. The gearbox 111a comprises a first shaft 102a mechanically connected to the electrical machine 101a and a second shaft 113a for driving the actuator 112a. The gearbox 111a is capable of providing selectable transmission ratios each being a ratio of the rotational speed of the shaft 102a to the rotational speed of the shaft 113a, i.e. $n_1/n_2$, where $n_1$ is the rotational speed of the shaft 102a and $n_2$ is the rotational speed of the shaft 113a. Correspondingly, the gearbox 111b comprises a first shaft 102b mechanically connected to the electrical machine 101b and a second shaft 113b for driving the actuator 112b, and the gearbox 111b is capable of providing selectable transmission ratios each being a ratio of the rotational speed of the shaft 102b to the rotational speed of the shaft 113b.

The electromechanical drive 100 comprises an electrical power converter 103 for converting voltage of an external electrical system to voltages suitable for the electrical machines 101a and 101b. In this exemplifying case, the above-mentioned external electrical system comprises the combustion engine 107, the generator 108, and the electronic power converter 109. The electrical power converter 103 comprises a controller 105a for selecting one of the selectable transmission ratios provided by the gearbox 111a at least partly on the basis of a) first data related to an actual and/or desired torque-speed operating point of the shaft 113a when driving the actuator 112a and b) second data related to functional properties of at least the electrical machine 101a. The actual torque-speed operating point of the shaft 113a is defined by the prevailing torque acting on the shaft 113a and the prevailing rotational speed of the shaft 113a. The desired torque-speed operating point of the shaft 113a is defined by a target value of the torque acting on the shaft 113a and the prevailing rotational speed of the shaft 113a, or by the prevailing torque acting on the shaft 113a and a target value of the rotational speed of the shaft 113a, or by the target values of the above-mentioned rotational speed and torque. Thus, the first data can be indicative of for example the rotational speed of the shaft 113a and/or its target value, the torque acting on the shaft 113a and or its target value, and/or the mechanical power transferred by the shaft 113a and/or its target value. The electrical power converter 103 comprises a signal output 106a for delivering, to the gearbox 111a, a control signal so as to set the gearbox 111a to operate at the selected one of the selectable transmission ratios. The electrical power converter 103 further comprises a controller 105b for selecting one of the selectable transmission ratios provided by the gearbox 111b and a signal output 106b for delivering, to the gearbox 111b, a control signal so as to set the gearbox 111b to operate at the selected one of the selectable transmission ratios. The electrical machines 101a and 101b are advantageously controlled independently of each other. Correspondingly, the gearboxes 111a and 111b are advantageously controlled independently of each other. There are numerous ways to select the transmission ratios of the gearboxes 111a and 111b so that the operation of the electromechanical drive 100 is at least partially optimized. Some exemplifying ways are presented below with reference to the controller 105a. The controller 105b can operate in a corresponding way.

In an electromechanical drive according to an exemplifying and non-limiting embodiment of the invention, the controller 105a is adapted to control the gearbox 111a to shift from a higher one of the selectable transmission ratios to a lower one of the selectable transmission ratios in response to a situation in which the rotational speed of the electrical machine achieves a field weakening point where voltage of the electrical machine achieves a maximum voltage available from electrical power converter 103. In this case, it is assumed that the efficiency of the electrical machine 101a is better when operating with its nominal magnetic flux than when operating with a magnetic flux less than the nominal magnetic flux.

In an electromechanical drive according to an exemplifying and non-limiting embodiment of the invention, the controller 105a is adapted to select such one of the selectable transmission ratios which yields such a torque-speed operating point of the electrical machine 101a where losses comprising at least losses of the electrical machine are smaller than when using another one of the selectable transmission ratios. Therefore, the selected transmission ratio is such that the efficiency is greater than the corresponding efficiency in a situation where some other transmission ratio is used at the prevailing torque-speed operation point of the actuator 112a. The above-mentioned efficiency means the efficiency of the electrical machine 101a or the efficiency of the combination constituted by the electrical machine 101a and one or both of the following: the gearbox 111a and an output stage 114a of the electrical power converter 103. The controller 105a can be adapted maintain for example a lookup-table or another data structure for identifying the most advantageous one of the selectable transmission ratios on the basis of the prevailing torque-speed operating point of the actuator 112a. The torque-speed operating point of the actuator 112a can be determined when estimates of at least two of the following are known: the power transferred by the shaft 113a, the rotational speed of the shaft 113a, and the torque acting on the shaft 113a. In this case, the above-mentioned lookup-table or the other data structure represents the second data related to the functional properties of at least the electrical machine. The estimate of the rotational speed of the shaft 113a can be obtained with the aid of a rotational speed indicator 115. The estimate of the torque acting on the shaft 113a and the estimate of the power transferred by the shaft 113a can be obtained on the basis of the currents and voltages of the electrical machine 101a. The above-mentioned lookup-table or the other data structure can be constructed for example with the aid of load tests where the power of the actuator 112a and the power supplied to the output stage 114a are measured and/or estimated at different torque-speed operating points of the actuator 112a so that different transmission ratios are used.

In an electromechanical drive according to an exemplifying and non-limiting embodiment of the invention, the controller 105a is adapted to select one of the selectable transmission ratios so that a target value of torque $T_{ref}/Q$ of the electrical machine is as near as possible to torque $T_{opt}$ corresponding to such a torque-speed operating point of the electrical machine 101a where the power of the electrical machine is P and losses comprising at least losses of the electrical machine are smaller than when producing the same power P with torque different from $T_{opt}$. The above-mentioned $T_{ref}$ is a target value of the torque acting on the shaft 113a, the above-mentioned Q is the selected one of the selectable transmission ratios, and the power P is $T_{ref} \times$the prevailing rotational speed of the shaft 113a. In this case, it is assumed that the actuator 112a is driven in a torque controlled mode according to a torque reference. In an electromechanical drive according to an exemplifying and non-limiting embodiment of the invention, the controller 105a is adapted to produce the value of the torque $T_{opt}$ at least partly on the basis of the second data related to the functional properties of at least the electrical machine 101a, the target value $T_{ref}$ of the torque acting on the shaft 113a, and the estimate of the rotational speed of the shaft 113a. The controller 105a can be adapted maintain a lookup-table or another data structure for providing the value of the torque $T_{opt}$ on the basis of the estimate of the rotational speed of the shaft 113a and the target value $T_{ref}$ of the torque acting on the shaft 113a. The above-mentioned lookup-table or the other data structure can be constructed for example with the aid of load tests where the power of the actuator 112a and the power supplied to the output stage 114a are measured and/or estimated at different torque-speed operating points of the actuator 112a so that different transmission ratios are used.

In an electromechanical drive according to an exemplifying and non-limiting embodiment of the invention, the controller 105a is adapted to select one of the selectable transmission ratios so that a target value of rotational speed $S_{ref} \times Q$ of the electrical machine is as near as possible to rotational speed $S_{opt}$ corresponding to such a torque-speed operating point of the electrical machine 101a where the power of the electrical machine is P and losses comprising at least losses of the electrical machine are smaller than when producing the same power P at rotational speed different from $S_{opt}$. The above-mentioned $S_{ref}$ is a target value of the rotational speed of the shaft 113a, the above-mentioned Q is the selected one of the selectable transmission ratios, and the power P is $S_{ref} \times$ the torque acting on the shaft 113a. In this case, it is assumed that the actuator 112a is driven in a speed controlled mode according to a rotational speed reference. In an electromechanical drive according to an exemplifying and non-limiting embodiment of the invention, the controller 105a is adapted to produce the value of the rotational speed $S_{opt}$ at least partly on the basis of the second data related to the functional properties of at least the electrical machine 101a, the target value $S_{ref}$ of the rotational speed of the shaft 113a, and the estimate of the torque acting on the shaft 113a. The controller 105a can be adapted maintain a lookup-table or another data structure for providing the value of the rotational speed $S_{opt}$ on the basis of the estimate of the estimate of the torque acting on the shaft 113a and the target value $S_{ref}$ of the rotational speed of the shaft 113a. The above-mentioned lookup-table or the other data structure can be constructed for example with the aid of load tests where the power of the actuator 112a and the power supplied to the output stage 114a are measured and/or estimated at different torque-speed operating points of the actuator 112a so that different transmission ratios are used.

In an electromechanical drive according to an exemplifying and non-limiting embodiment of the invention, the controller 105a is adapted to apply hysteresis when shifting from a first one of the selectable transmission ratios to a second one of the selectable transmission ratios and back from the second one of the selectable transmission ratios to the first one of the selectable transmission ratios in order to prevent back and forth oscillations between these two transmission ratios in a situation where the torque-speed operating point of the actuator 112a fluctuates around a limit on one side of which the first one of the selectable transmission ratios is more advantageous and on the other side of which the second one of the selectable transmission ratios is more advantageous. The above-mentioned hysteresis can be implemented so that a limit used for the transition from the first one of the selectable transmission ratios to the second one of the selectable transmission ratios is different from a limit used for the transition in the opposite direction, i.e. from the second one of the selectable transmission ratios to the first one of the selectable transmission ratios. The above-presented hysteresis can be applied in conjunction with any of the above-presented exemplifying ways for selecting the transmission ratio.

The exemplifying electromechanical power transmission chain illustrated in FIG. 1 comprises a capacitive intermediate circuit 110 between the electronic power converter 109 and the electromechanical drive 100. In some other cases, there could be an inductive intermediate circuit between the electronic power converter 109 and the electromechanical drive 100. Furthermore, it is also possible that there is a direct converter between the generator 108 and each of the electrical machines 101a and 101b so that there is no energy storing intermediate circuit. It is worth noting that the above-described principles for controlling the gearboxes 111a and 111b are not related or bound to any particular types of electrical machines, nor to any particular types of electrical power converters, and nor to any particular types of gearboxes. Furthermore, it is to be noted that the control signal transmitted by the electronic power converter to the gearbox so as to set the gearbox to operate at the desired transmission ratio can be e.g. an electrical signal, a hydraulic signal, a pneumatic signal, or a mechanical signal implemented with mechanical means such as e.g. a wire rope.

In some situations, e.g. during braking, one or both of the electrical machines 101a and 101b may operate as a generator that may charge the capacitive intermediate circuit 110 so strongly that the capacitive intermediate circuit 110 is not sufficient for storing the generated electrical energy. In order to store the generated electrical energy, the electromechanical power transmission chain can be provided with a battery element 118 and a controllable direct voltage converter 119. In addition to or instead of the battery element 118, the electromechanical power transmission chain can be provided with an electric double layer capacitor "EDLC" 120, i.e. a so called "super capacitor". The energy stored by the battery element and/or by the electric double layer capacitor can be arranged to respond to peak power needs exceeding the maximum power available from the combustion engine 107. Furthermore, the electromechanical power transmission chain can be provided with a brake resistor 121 for absorbing the braking energy in situations where it is not possible to supply the braking energy to the battery element and/or to the electric double layer capacitor.

Figure 2:
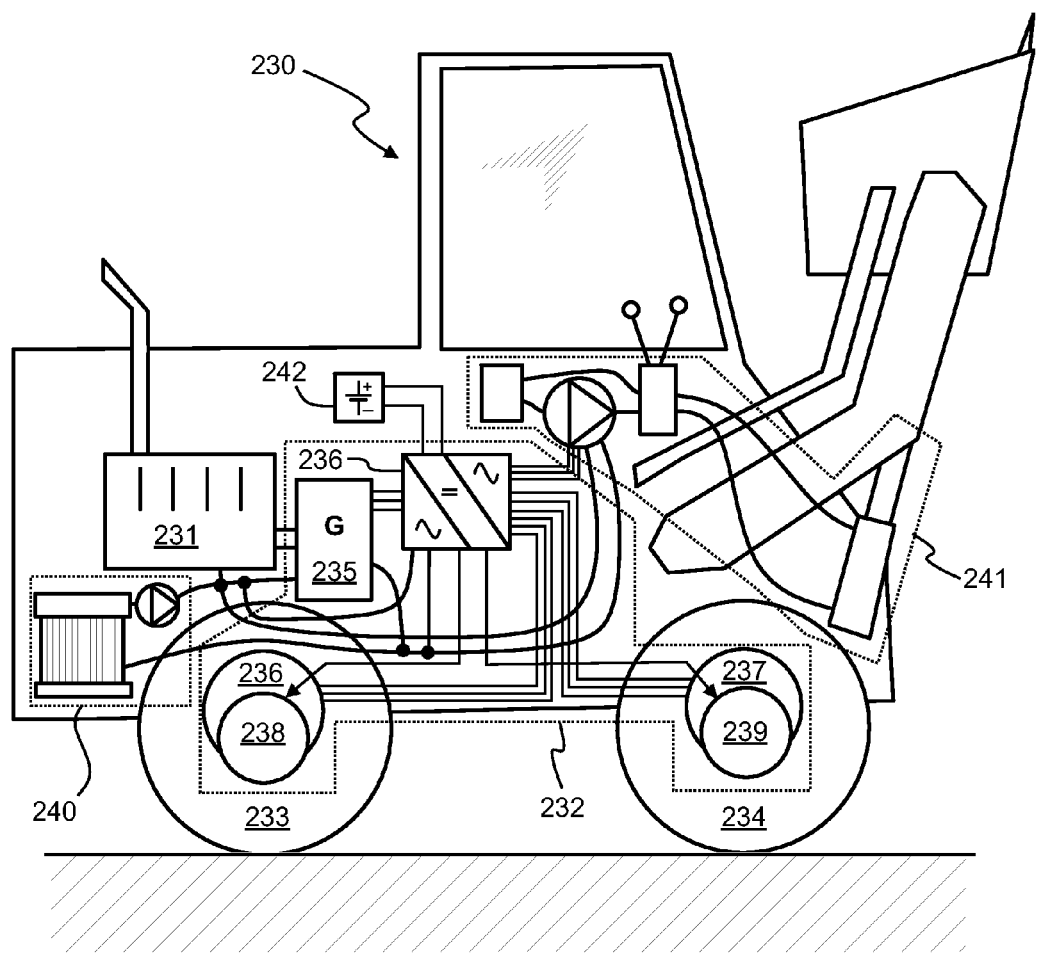
FIG. 2 shows a schematic illustration of a working machine according to an exemplifying and non-limiting embodiment of the invention.

FIG. 2 shows a schematic illustration of a mobile working machine 230 according to an exemplifying and non-limiting embodiment of the invention. In this exemplifying case, the mobile working machine is a bucket charger but the mobile working machine could as well be a tractor, a road drag, a bulldozer, or any other working machine having wheels and/or chain tracks. The mobile working machine comprises a combustion engine 231 that can be e.g. a diesel engine, an Otto-cycle engine, or a turbine engine. The mobile working machine comprises an electromechanical power transmission chain 232 between the combustion engine and wheels 233, 234 of the mobile working machine. The electromechanical transmission chain comprises an electrical machine 235 the rotor of which is connected to the shaft of the combustion engine 231. The electromechanical transmission chain further comprises an electromechanical drive for driving the wheels 233, 234 of the mobile working machine with the aid of the electrical energy generated by the electrical machine 235. The electromechanical drive comprises an electrical power converter 236 and electrical machines 236, 237. In this case, the electrical power converter 236 is a frequency converter. The electromechanical drive further comprises gearboxes 238 and 239 arranged to connect the shafts of the electrical machines 236, 237 to the hubs of the wheels 233, 234. The electrical power converter 236 is adapted to convert the electrical voltage produced by the electrical machine 235 into electrical voltages having amplitudes and frequencies suitable for the electrical machines 364, 365. The electrical power converter 236 may have separate output stages for all the electrical machines 236, 237 in which case each of these electrical machines can be controlled individually, or all the electrical machines 236, 237 can be connected to one and the same output stage of the frequency converter in which case these electrical machines are controlled as a group. Each of the gearboxes 238, 239 has a first shaft connected to the respective electrical machine and a second shaft for driving the respective wheel of the mobile working machine. Each of the gearboxes 238, 239 is capable of providing selectable transmission ratios between its first and second shafts. The electrical power converter 236 comprises a controller for controlling each of the gearboxes at least partly on the basis of a) actual and/or desired operation of the respective wheel of the mobile working machine and b) data related to functional properties of at least the electrical machine connected to the gearbox under consideration. Furthermore, the electrical power converter 236 comprises a signal output for delivering, to the gearboxes, control signals for controlling the operation of the gearboxes. The electrical machines 236, 237 are advantageously controlled independently of each other, and also the gearboxes 238, 239 are advantageously controlled independently of each other. The independent control is advantageous because for example, when the mobile working machine is moving along a curved path, the wheels on the inner-curve side operate at a different torque-speed operating point than the wheels on the outer-curve side.

A mobile working machine according to an exemplifying and non-limiting embodiment of the invention comprises a liquid cooling system 240 arranged to cool the electromechanical power transmission chain 232.

A mobile working machine according to an exemplifying and non-limiting embodiment of the invention comprises a liquid cooling system arranged to cool both a hydraulic system 241 of the mobile working machine and the electromechanical power transmission chain 232.

A mobile working machine according to an exemplifying and non-limiting embodiment of the invention comprises a liquid cooling system arranged to cool both the electromechanical power transmission chain 232 and the combustion engine 231.

In a mobile working machine according to an exemplifying and non-limiting embodiment of the invention, the electromechanical power transmission chain comprises a battery 242 and/or an electric double-layer capacitor "EDLC" arranged to respond to peak power needs exceeding the maximum power of the combustion engine 231. The battery and/or the electric double-layer capacitor can be connected, for example, to a direct voltage intermediate circuit of the electrical power converter 236. An electric double-layer capacitor is often called a "super capacitor".

Figure 3:
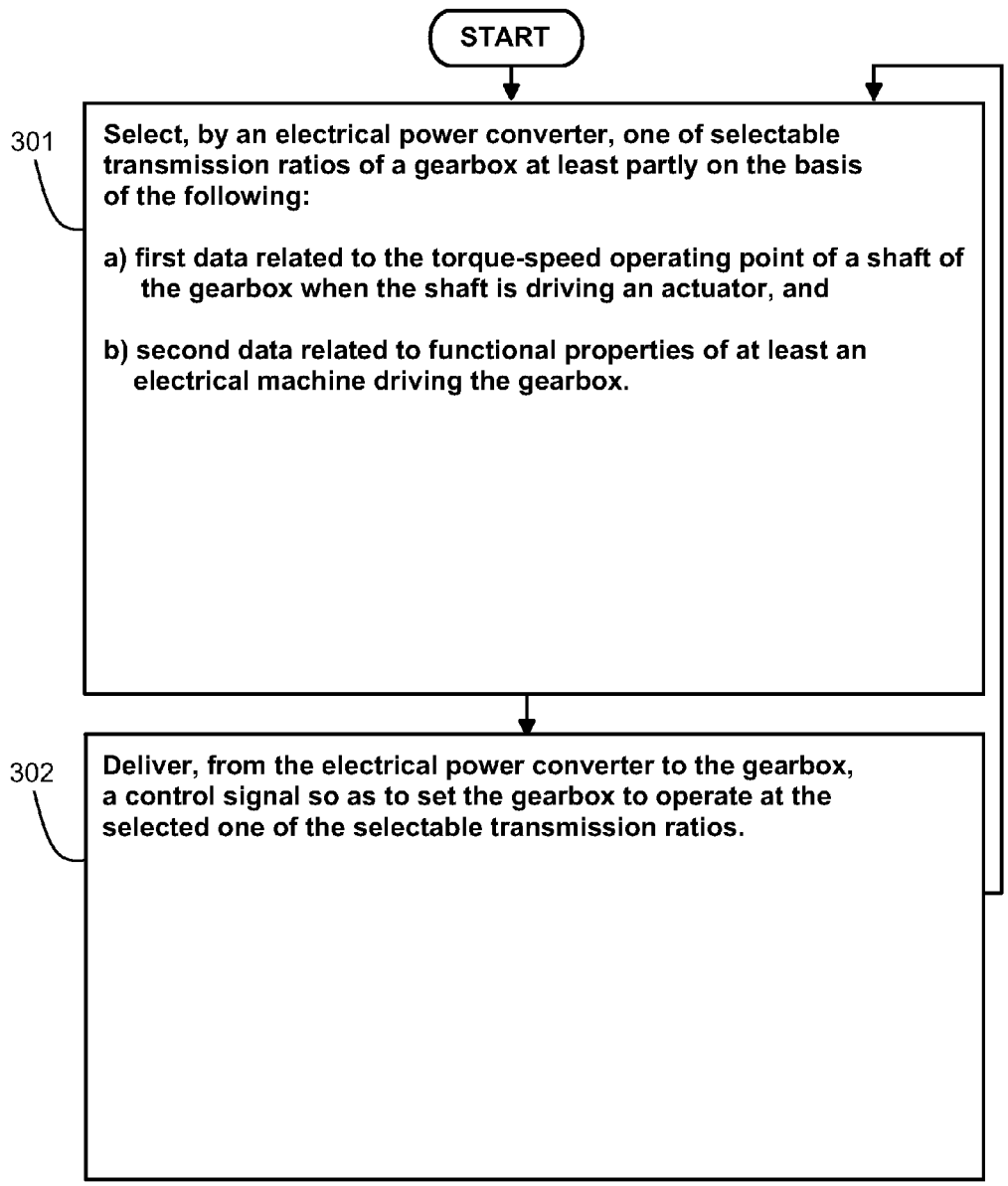
FIG. 3 shows a flow chart of a method according to an exemplifying and non-limiting embodiment of the invention for controlling an electromechanical drive.

FIG. 3 shows a flow chart of a method according to an exemplifying and non-limiting embodiment of the invention for controlling an electromechanical drive that comprises an electrical machine, an electrical power converter for converting voltage of an external electrical system to voltage suitable for the electrical machine, and a gearbox having a first shaft connected to the electrical machine and a second shaft for driving an actuator, where the gearbox is capable of providing selectable transmission ratios each being a ratio of a rotational speed of the first shaft to a rotational speed of the second shaft. The method comprises the following actions:

action 301: selecting, by the electrical power converter, one of the selectable transmission ratios at least partly on the basis of a) first data related to an actual or desired torque-speed operating point of the second shaft when driving the actuator and b) second data related to functional properties of at least the electrical machine, and action 302: delivering, from the electrical power converter to the gearbox, a control signal so as to set the gearbox to operate at the selected one of the selectable transmission ratios.

A method according to an exemplifying and non-limiting embodiment of the invention comprises controlling the gearbox to shift from a higher one of the selectable transmission ratios to a lower one of the selectable transmission ratios in response to a situation in which a rotational speed of the electrical machine achieves a field weakening point where voltage of the electrical machine achieves a maximum voltage available from electrical power converter.

A method according to an exemplifying and non-limiting embodiment of the invention comprises selecting such one of the selectable transmission ratios which yields such a torque-speed operating point of the electrical machine where losses comprising at least losses of the electrical machine are smaller than when using another one of the selectable transmission ratios.

A method according to an exemplifying and non-limiting embodiment of the invention comprises maintaining a lookup-table for identifying the above-mentioned one of the selectable transmission ratios on the basis of the first data, wherein the first data is indicative of estimates of at least two of the following: the power transferred by the second shaft, the rotational speed of the second shaft, and the torque acting on the second shaft.

A method according to an exemplifying and non-limiting embodiment of the invention comprises selecting one of the selectable transmission ratios so that a target value of the torque $T_{ref}/Q$ of the electrical machine is as near as possible to the torque $T_{opt}$ corresponding to such a torque-speed operating point of the electrical machine where the power of the electrical machine is P and losses comprising at least losses of the electrical machine are smaller than when producing the power P with torque different from $T_{opt}$, where $T_{ref}$ is a target value of the torque acting on the second shaft, Q is the selected one of the selectable transmission ratios, and the power P is $T_{ref} \times$the rotational speed of the second shaft. In this case, it is assumed that the actuator is driven in a torque controlled mode according to a torque reference.

A method according to an exemplifying and non-limiting embodiment of the invention comprises producing the value of the torque $T_{opt}$ at least partly on the basis of the second data related to the functional properties of at least the electrical machine, the target value $T_{ref}$ of the torque acting on the second shaft, and an estimate of the rotational speed of the second shaft.

A method according to an exemplifying and non-limiting embodiment of the invention comprises maintaining a lookup-table for providing the value of the torque $T_{opt}$ on the basis of the target value $T_{ref}$ of the torque acting on the second shaft and the estimate of the rotational speed of the second shaft.

A method according to an exemplifying and non-limiting embodiment of the invention comprises selecting one of the selectable transmission ratios so that a target value of rotational speed $S_{ref} \times Q$ of the electrical machine is as near as possible to the rotational speed $S_{opt}$ corresponding to such a torque-speed operating point of the electrical machine where the power of the electrical machine is P and losses comprising at least losses of the electrical machine are smaller than when producing the power P at rotational speed different from $S_{opt}$, where $S_{ref}$ is a target value of rotational speed of the second shaft, Q is the selected one of the selectable transmission ratios, and the power P is $S_{ref} \times$torque acting on the second shaft. In this case, it is assumed that the actuator is driven in a speed controlled mode according to a rotational speed reference.

A method according to an exemplifying and non-limiting embodiment of the invention comprises producing the value of the rotational speed $S_{opt}$ at least partly on the basis of the second data related to the functional properties of at least the electrical machine, the target value $S_{ref}$ of the rotational speed of the second shaft, and an estimate of the torque acting on the second shaft.

A method according to an exemplifying and non-limiting embodiment of the invention comprises maintaining a lookup-table for providing the value of the rotational speed $S_{opt}$ on the basis of the target value $S_{ref}$ of the rotational speed of the second shaft and the estimate of the torque acting on the second shaft.

A method according to an exemplifying and non-limiting embodiment of the invention comprises applying hysteresis when shifting from a first one of the selectable transmission ratios to a second one of the selectable transmission ratios and back from the second one of the selectable transmission ratios to the first one of the selectable transmission ratios in order to prevent back and forth oscillations between these two transmission ratios in a situation where the torque-speed operating point of the actuator fluctuates around a limit on one side of which the first one of the selectable transmission ratios is more advantageous and on the other side of which the second one of the selectable transmission ratios is more advantageous.

A computer program according to an exemplifying and non-limiting embodiment of the invention comprises computer executable instructions for controlling a programmable processing system to carry out actions related to a method according to any of the above-described exemplifying embodiments of the invention.

A computer program according to an exemplifying and non-limiting embodiment of the invention comprises software modules for controlling an electromechanical drive that comprises an electrical machine, an electrical power converter for converting voltage of an external electrical system to voltage suitable for the electrical machine, and a gearbox having a first shaft connected to the electrical machine and a second shaft for driving an actuator, where the gearbox is capable of providing selectable transmission ratios each being a ratio of a rotational speed of the first shaft to a rotational speed of the second shaft.

The above-mentioned software modules comprise computer executable instructions for controlling a programmable processing system of the electrical power converter to:

select one of the selectable transmission ratios at least partly on the basis of a) first data related to the torque-speed operating point of the second shaft when driving the actuator and b) second data related to functional properties of at least the electrical machine, and transmit, from the electrical power converter to the gearbox, a control signal so as to set the gearbox to operate at the selected one of the selectable transmission ratios.

The software modules can be e.g. subroutines or functions implemented with a suitable programming language and with a compiler suitable for the programming language and for the above-mentioned programmable processing system.

A computer program product according to an exemplifying and non-limiting embodiment of the invention comprises a computer readable medium, e.g. a compact disc "CD", encoded with a computer program according to an exemplifying embodiment of invention.

A signal according to an exemplifying and non-limiting embodiment of the invention is encoded to carry information defining a computer program according to an exemplifying embodiment of invention.

The specific examples provided in the description given above should not be construed as limiting the scope and/or the applicability of the appended claims.

What is claimed is:

1. An electromechanical drive, comprising:
   an electrical machine;
   a gearbox having a first shaft connected to the electrical machine and a second shaft for driving an actuator, the gearbox being capable of providing selectable transmission ratios each being a ratio of a rotational speed of the first shaft to a rotational speed of the second shaft; and
   an electrical power converter for converting voltage of an external electrical system into voltage suitable for the electrical machine,
   wherein the electrical power converter comprises:
      a controller for selecting one of the selectable transmission ratios on the basis of a) first data related to a torque-speed operating point of the second shaft when driving the actuator and b) second data related to functional properties of at least the electrical machine, and
      a signal output for delivering, to the gearbox, a control signal so as to set the gearbox to operate at the selected one of the selectable transmission ratios.

2. The electromechanical drive according to claim 1, wherein the controller is adapted to control the gearbox to shift from a higher one of the selectable transmission ratios to a lower one of the selectable transmission ratios in response to a situation in which a rotational speed of the electrical machine achieves a field weakening point where voltage of the electrical machine achieves a maximum voltage available from electrical power converter.

3. The electromechanical drive according to claim 1, wherein the controller is adapted to select such one of the selectable transmission ratios which, according to the second data, yields such a torque-speed operating point of the electrical machine where losses comprising at least losses of the electrical machine are smaller than when using another one of the selectable transmission ratios.

4. The electromechanical drive according to claim 3, wherein the controller is adapted maintain a lookup-table for identifying the one of the selectable transmission ratios on the basis of the first data, and wherein the first data is indicative of estimates of at least two of the following: power transferred by the second shaft, rotational speed of the second shaft, torque acting on the second shaft.

5. The electromechanical drive according to claim 1, wherein the controller is adapted to select one of the selectable transmission ratios so that a target value of torque $T_{ref}/Q$ of the electrical machine is as near as possible to torque $T_{opt}$ corresponding to such a torque-speed operating point of the electrical machine where power of the electrical machine is P and losses comprising at least losses of the electrical machine are smaller than when producing the power P with torque different from $T_{opt}$, $T_{ref}$ being a target value of torque acting on the second shaft, Q being the selected one of the selectable transmission ratios, and P being $T_{ref}\times$rotational speed of the second shaft.

6. The electromechanical drive according to claim 5, wherein the controller is adapted to produce a value of the torque $T_{opt}$ at least partly on the basis of the second data and the first data, where the first data is indicative of the target value $T_{ref}$ of the torque acting on the second shaft and an estimate of the rotational speed of the second shaft.

7. The electromechanical drive according to claim 6, wherein the controller is adapted maintain a lookup-table for providing the value of the torque $T_{opt}$ on the basis of the target value $T_{ref}$ of the torque acting on the second shaft and the estimate of the rotational speed of the second shaft.

8. The electromechanical drive according to claim 1, wherein the controller is adapted to select one of the selectable transmission ratios so that a target value of rotational speed $S_{ref} \times Q$ of the electrical machine is as near as possible to rotational speed $S_{opt}$ corresponding to such a torque-speed operating point of the electrical machine where power of the electrical machine is P and losses comprising at least losses of the electrical machine are smaller than when producing the power P at rotational speed different from $S_{opt}$, $S_{ref}$ being a target value of rotational speed of the second shaft, Q being the selected one of the selectable transmission ratios, and P being $S_{ref} \times$ torque acting on the second shaft.

9. The electromechanical drive according to claim 8, wherein the controller is adapted to produce a value of the rotational speed $S_{opt}$ at least partly on the basis of the second data and the first data, where the first data is indicative of the target value $S_{ref}$ of the rotational speed of the second shaft and an estimate of the torque acting on the second shaft.

10. The electromechanical drive according to claim 9, wherein the controller is adapted maintain a lookup-table for providing the value of the rotational speed $S_{opt}$ on the basis of the target value $S_{ref}$ of the rotational speed of the second shaft and the estimate of the torque acting on the second shaft.

11. A mobile working machine, comprising:
a combustion engine; and
an electromechanical power transmission chain between the combustion engine and one or more actuators of the mobile working machine,
wherein the electromechanical transmission chain comprises at least one electromechanical drive comprising:
an electrical machine,
a gearbox having a first shaft connected to the electrical machine and a second shaft for driving one of the actuators, the gearbox being capable of providing selectable transmission ratios each being a ratio of a rotational speed of the first shaft to a rotational speed of the second shaft, and
an electrical power converter for converting input voltage of the electrical power converter into voltage suitable for the electrical machine,
and wherein the electrical power converter comprises:
a controller for selecting one of the selectable transmission ratios on the basis of a) first data related to a torque-speed operating point of the second shaft when driving the actuator and b) second data related to functional properties of at least the electrical machine, and
a signal output for delivering, to the gearbox, a control signal so as to set the gearbox to operate at the selected one of the selectable transmission ratios.

12. A method for controlling an electromechanical drive that includes an electrical machine, an electrical power converter for converting voltage of an external electrical system to voltage suitable for the electrical machine, and a gearbox having a first shaft connected to the electrical machine and a second shaft for driving an actuator, the gearbox being capable of providing selectable transmission ratios each being a ratio of a rotational speed of the first shaft to a rotational speed of the second shaft, the method comprising:
selecting, by the electrical power converter, one of the selectable transmission ratios on the basis of a) first data related to a torque-speed operating point of the second shaft when driving the actuator and b) second data related to functional properties of at least the electrical machine; and
delivering, from the electrical power converter to the gearbox, a control signal so as to set the gearbox to operate at the selected one of the selectable transmission ratios.

13. A non-volatile computer readable medium encoded with a computer program for controlling an electromechanical drive that includes an electrical machine, an electrical power converter for converting voltage of an external electrical system to voltage suitable for the electrical machine, and a gearbox having a first shaft connected to the electrical machine and a second shaft for driving an actuator, the gearbox being capable of providing selectable transmission ratios each being a ratio of a rotational speed of the first shaft to a rotational speed of the second shaft, the computer program comprising computer executable instructions for controlling a programmable processing system of the electrical power converter to:
select one of the selectable transmission ratios on the basis of a) first data related to a torque-speed operating point of the second shaft when driving the actuator and b) second data related to functional properties of at least the electrical machine; and
transmit, from the electrical power converter to the gearbox, a control signal so as to set the gearbox to operate at the selected one of the selectable transmission ratios.

* * * * *